Dec. 5, 1961 W. B. WILSON 3,011,509
IRRIGATION HYDRANT
Filed Oct. 17, 1957 3 Sheets-Sheet 1
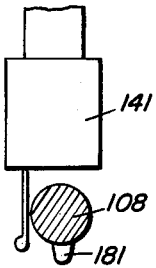
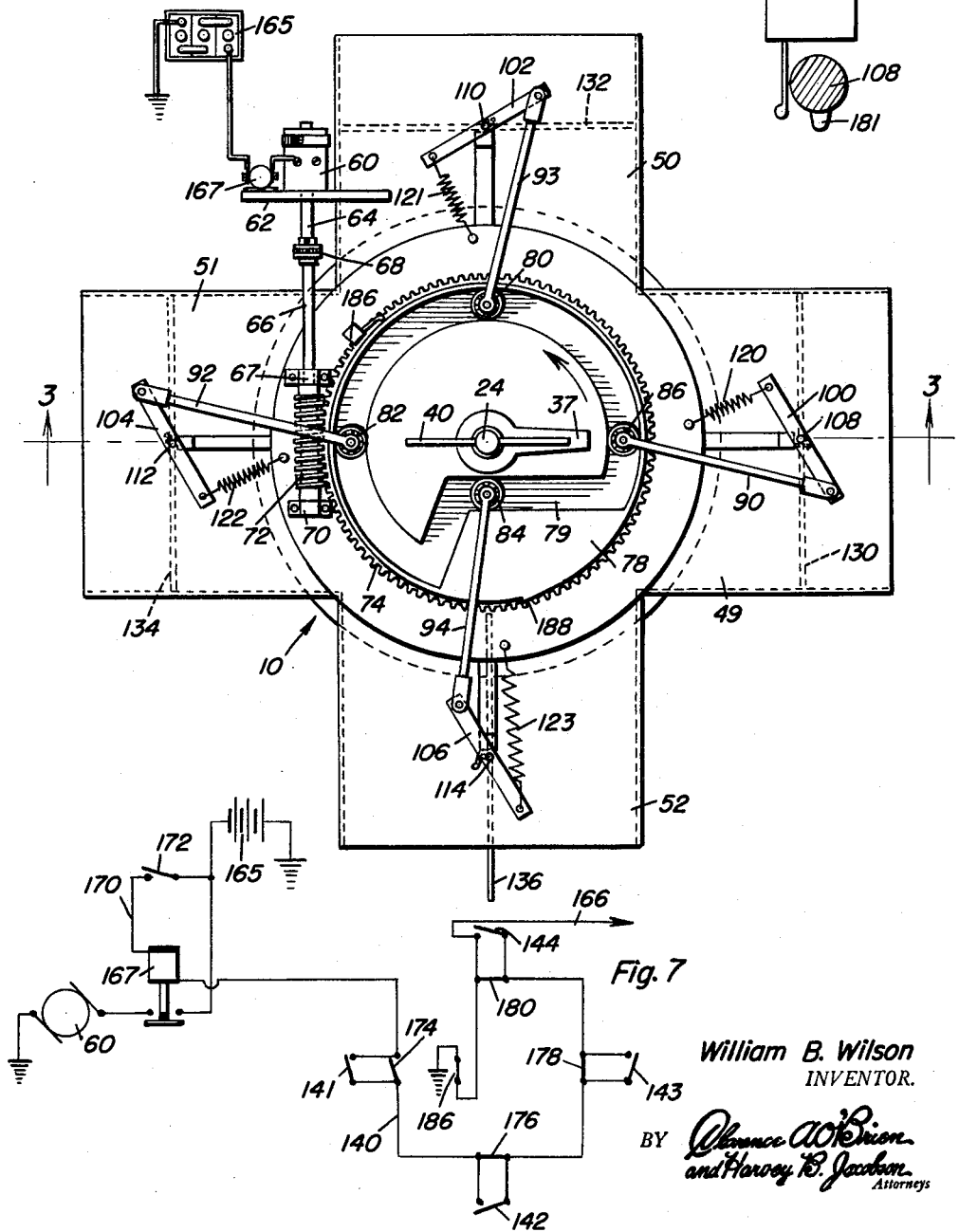
William B. Wilson
INVENTOR.

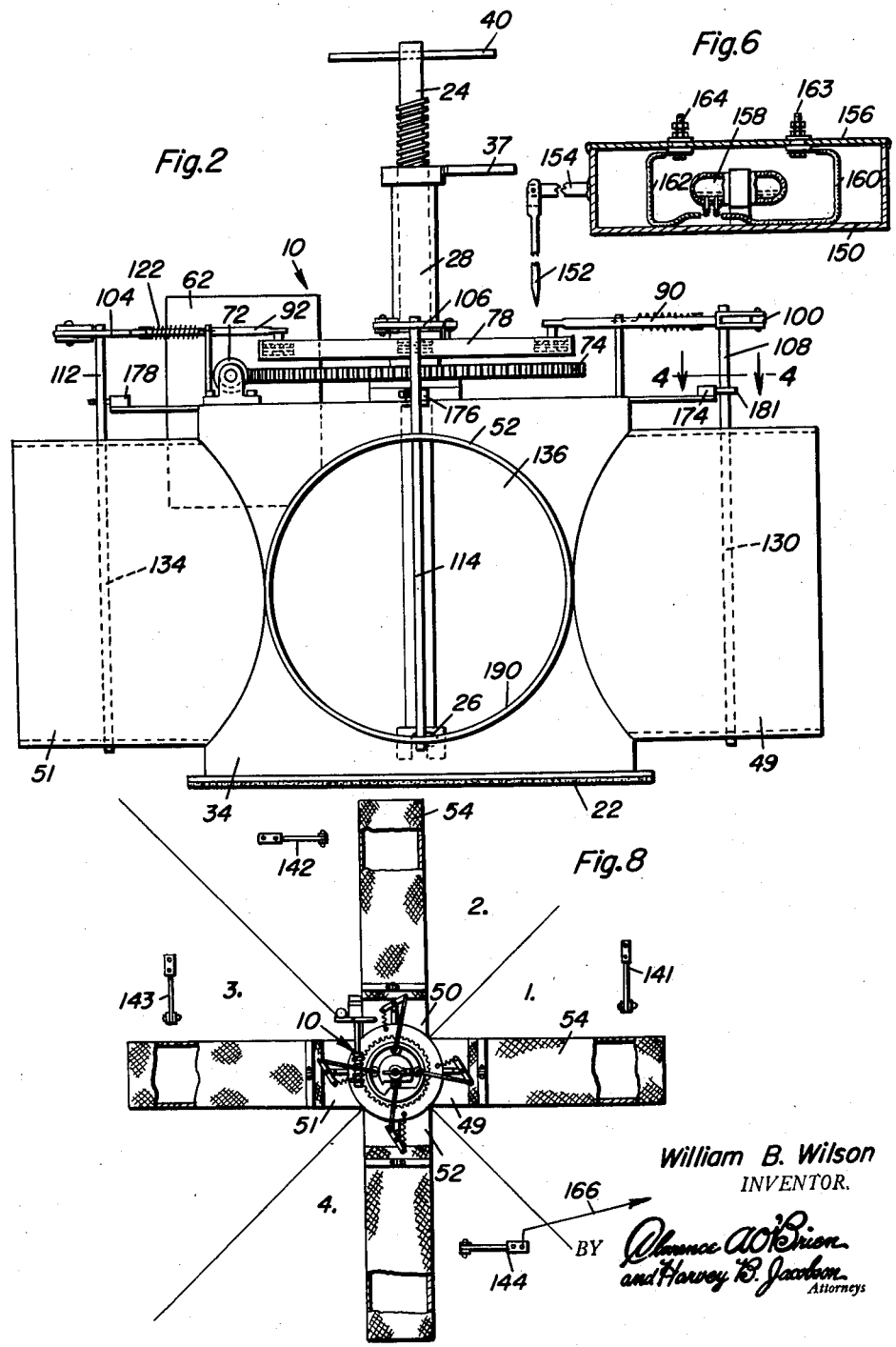

Dec. 5, 1961 W. B. WILSON 3,011,509
IRRIGATION HYDRANT
Filed Oct. 17, 1957 3 Sheets-Sheet 3
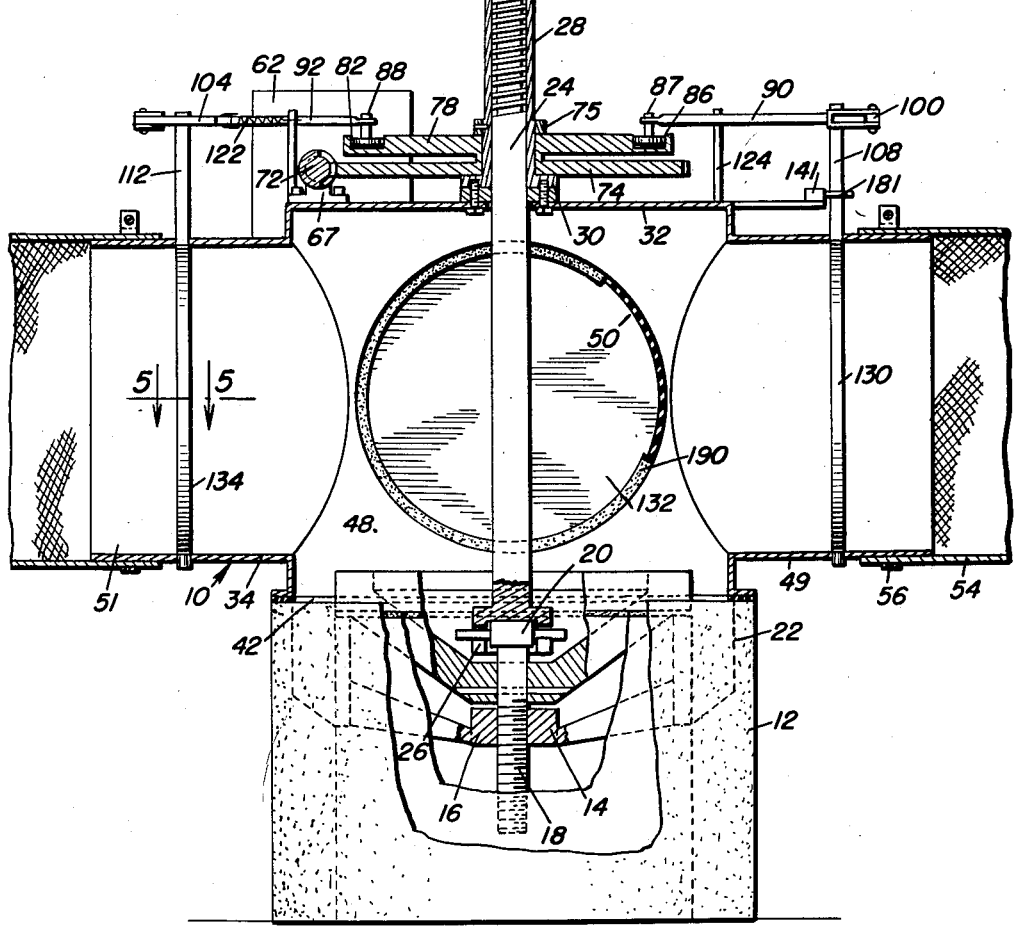
William B. Wilson
INVENTOR.

United States Patent Office 3,011,509
Patented Dec. 5, 1961

3,011,509
IRRIGATION HYDRANT
William B. Wilson, 511 Central National Bank Bldg.,
San Angelo, Tex.
Filed Oct. 17, 1957, Ser. No. 690,694
7 Claims. (Cl. 137—122)

This invention relates to an automatic irrigation hydrant and more particularly to an irrigation hydrant which functions as an applicance for underground pipe line irrigation systems that have extensions which protrude above or to the soil surface and which are ordinarily controlled by valves. My hydrant may be considered as a portable unit or may be permanently installed.

At the present time there is a wide use of underground concrete pipe lines that have T's or extensions that come to the soil surface and upon which there is a flat valve. Ordinarily a portable hydrant is connected at the valves and manually moved from one location to another. In addition the ordinary portable hydrant is changed from one irrigation border to another by manual means while at the same location.

My automatic hydrant will prevent the necessity of changing the hydrant from one border to another and will automatically, cyclically fill one irrigation border to the correct height and then by virtue of automatic means will change the direction of water issuing from the hydrant to the next adjacent border. When this next adjacent border is filled to the desired level the hydrant will automatically move to the next border and so on through the entire cycle.

It is preferred that the entire operation be electrically operated and electrically controlled and actuated. The borders may be arranged in quadrature with the hydrant at the center, however it is understood that a larger or smaller number of borders could be adopted.

A further object of the invention is to provide an automatic hydrant which functions to raise the water level in borders arranged about the hydrant and automatically trigger the operation of a next adjacent hydrant which feeds from another extension spaced from the first mentioned hydrant.

My hydrants can be installed either singly or in two or more, and the electrical circuits of each may be interlocked or at least connected so that the completion of the cycle of operation of one hydrant automatically triggers the operational cycle of the circuit in the next hydrant.

Important features of my invention are that it is portable and automatic. Other hydrants are available but they are not portable and they are not used for irrigation purposes, and they are so designed that the cost is prohibitive for irrigation use. Portable irrigation hydrants that are available, are not automatic. Therefore, my invention couples together the features of a really portable hydrant that includes an automatic operation, made so by an electrical circuit that is responsive to the fluid levels in the various borders around the hydrant.

Other objects, features and alternatives, such as the use of the water pressure itself as a motive force instead of electrical energy or the use of compressed air or other common drives, will become apparent in following the description of the illustrated form of the invention.

FIGURE 1 is a top view of an automatic hydrant exemplifying the invention.

FIGURE 2 is an elevational view of the hydrant in FIGURE 1.

FIGURE 3 is a sectional view taken on the line 3—3 of FIGURE 1.

FIGURE 4 is an enlarged fragmentary sectional view taken on the line 4—4 of FIGURE 2 and showing a typical switch and switch operator on one of the valve stems of the hydrant.

FIGURE 5 is a sectional view taken on the line 5—5 of FIGURE 3 showing a typical hydrant valve.

FIGURE 6 is an enlarged sectional view of one of the floats and switch carried by the float which would be mounted in one of the borders of a typical area to be serviced by my hydrant.

FIGURE 7 is a largely schematic wiring diagram showing the arrangement of switches of my hydrant.

FIGURE 8 is a top view of a typical hydrant in a field of four borders.

My hydrants, which may be used either alone or in banks of two or more, are designed to be either portable or used as permanent installations. A typical hydrant 10 is installed on a subterranean irrigation water outlet 12 that rises above the soil surface. The outlets are generally formed by T's or like connections to the underground water conductor and they accommodate valves, such as valve 14 (FIG. 3). Valve 14 schematically represents any type of standard irrigation valve, space limitations requiring that a typical valve 14 that has a movable valve member 16 actuated by screw 18, be illustrated. Handle 20 is on screw 18 to facilitate manual operation of valve 14.

Hydrant 10 is placed above the valve and is tightened down against sealing ring 22 on the upper extremity of the water outlet 12. Threaded shaft 24 is passed centrally through hydrant 10 and has a coupling 26 at its lower extremity to releasably attach to handle 20. Spacer 28 is mounted on shaft 24 and is bolted by flange 30 to the top wall 32 of the hydrant casing 34. Lock nut 36 having handle 37, is threaded on shaft 24 and bears against spacer 28 until proper tension is developed in shaft 24 which compresses sealing ring 22 sufficiently to prevent leakage. Handle 20 has short arms protruding laterally from it (FIGS. 2 and 3) and they pass through a keyhole slot in coupling 26 to assure an interlock between the screw 18 and the shaft 24. Handle 40 is at the outer end of shaft 24 and is manually manipulated to open valve 14 to enable water to enter the opening 42 in the bottom of the hydrant casing 34.

The area to be serviced by hydrant 10 is arranged in four borders, one, two, three and four, respectively. Each is arranged to emanate from a center on which the hydrant is located, and the borders are arranged in quadrature. It is to be clearly understood that a larger or smaller number of borders may be divided from the area that is being serviced by outlet 12. Hydrant casing 34 is in the shape of a plumbing fitting cross. Therefore it includes a center section 48 together with branches 49, 50, 51 and 52 which are at right angles to each other and which emanate from the center section 48. Water inlet 42 is in registry with the bottom part of the center section 48. Extensions 54 of the branches 49, 50, 51 and 52, are secured by straps 56 or like fastening devices, to the branches of the hydrant casing 34. The extensions are preferably flexible although this is not an essential. Such flexible materials as canvas or nylon or plastic will disperse the water over the border area with which it is associated without splashing or without causing cavities to be formed beneath a flowing stream.

Motor 60 is carried by motor mount 62, and the motor mount is secured to a part of the casing 34. Shaft 64 of the motor is connected to worm shaft 66 by coupling 68. Bearings 67 and 70 mount the worm shaft for rotation and are located on opposite sides of worm 72. This is in mesh with gear 74 that is mounted for rotation (FIG. 3) between flange 30 and collar 75 on sleeve 28. Plate 78 is fixed to the gear 74 for rotation with the gear. Cam track 79 is formed in the upper surface of plate 78, and it has four cam followers 80, 82, 84 and 86 held captive therein. Each cam follower is constructed of a wheel or ball bearing assembly to whose spindle an arm is attached.

Spindles 87 and 88 of the cam followers 82 and 86, have arms 90 and 92 connected to them at the outer ends of the arms. Arms 93 and 94 are similarly attached to the cam followers 80 and 84. Rockers 100, 102, 104 and 106 are mounted for oscillation on valve stems 108, 110, 112 and 114, respectively, and are connected at their ends by pivot couplings to the outer ends of arms 90, 93, 92 and 94, respectively. Springs 120, 121, 122 and 123 are attached at their extremities to binding posts 124 that rise from the top wall 32 of the hydrant casing 34 and are attached at their outer ends to the extremities of rockers 100, 102, 104 and 106, respectively. The springs oppose the oscillation in one direction of the rockers and function as means by which to press the cam followers against a wall of the cam 79.

The four valve stems 108, 110, 112 and 114, respectively, have valves 130, 132, 134 and 136, respectively, attached to them. These valves are operable in the four branches 49, 50, 51 and 52 of the casing 34. The mechanical operation of the hydrant is as follows: motor 60 is energized thereby establishing a drive connection between the shaft 64 of the motor and the four valves 130, 132, 134 and 136, respectively. Plate 78 rotates with gear 74 and due to the cam track 79 and the followers in the cam, the arms and rockers cause the valves in the branches to be sequentially opened and closed.

An elementary electrical circuit 140 (FIG. 7) is used with the hydrant and constitutes a part thereof. There are four float operated switches 141, 142, 143 and 144, respectively, which are set in the four borders, one, two, three, and four. A typical float 150 (FIG. 6) has a post 152 that is set in the ground and an arm 154 pivoted to the post. The float body 156 either contains or has mounted on it a mercury switch 158 from which wires 160 and 162 extend to binding posts 163 and 164. An electric conductor 166 extends from the last float switch 144, that is the one in the border four, and conducts an electrical signal to the next hydrant in the irrigation field in order to set the next hydrant into motion after hydrant 10 has completed its cycle of operation.

A source of electrical potential, for example battery 165 is connected to a solenoid operated relay 167 of the type which is found in automotive starting systems. In fact, battery 165 can be a six volt or twelve volt automotive storage battery, and motor 60, the starting motor or reworked generator of the type used in automobiles or trucks. Control voltage for the motor is fed to the winding of the solenoid relay 167 through wiring 170, and there is a manually operable switch 172 in this wiring to initially set the cycle of operation into motion. Four cam operated micro-switches 174, 176, 178 and 180, respectively, are mounted on the four branches 49, 50, 51 and 52 of the hydrant casing, and they are actuated by a cam 181, there being a single cam on each valve stem in the four branches. Each micro-switch has a float operated switch in shunt with it. Finally, a control switch 186, is mounted adjacent to the periphery of plate 78. Switch 186 is ordinarily closed, but is opened at the completion of a single cycle of operation by cam 188 on plate 78.

The operation of the invention with reference to the electrical circuit and the mechanical functioning takes the following pattern. Hydrant 10 is attached by quick disconnect means to the water outlet 12 to preserve the portable nature of the hydrant. Such means assume the form shown in FIG. 3 since handle 20 typifies the ordinary type of handle found in subterranean irrigation system valves. The rest position of the hydrant has the four branch valves closed, each being sealed quite effectively against the low pressure by peripheral gaskets 190, one supplied for each valve. Switch 172 is manually closed thereby setting motor shaft 64 into operation. This, in turn, causes plate 78 to rotate which results in movement of rocker 100 sufficient to open valve 130. Border one begins to become wet from the water which flows through extension 54 of branch 49. When a sufficient depth of water is in border one to elevate the float switch 141, the cam opened switch 174 is by-passed by the shunt connected switch 141 causing a completion of the motor circuit. This again rotates the worm and gear to further operated the cam track 79 and close valve 130 but open valve 132. This shuts off the water to border one but permits water to flow into border two. With the opening of valve 132, its micro-switch 178 is opened by the cam on the valve stem 110. This opens the circuit of the motor and it remains open until float switch 142 which is connected in parallel with microswitch 176 begins to conduct. This again closes the motor circuit for the irrigation of border three, after which the cycle is operated further for the irrigation of border four. Float switch 144, which is the final float switch in the cycle of operation, has an additional wire or cable 166 connected to it and operatively connected with the next adjacent hydrant to provide a starting voltage for the next adjacent hydrant. This starting voltage would be applied directly to the coil of the solenoid of the next adjacent hydrant or would actuate a holding relay to cause the next hydrant to begin its automatic cycle of operation. Further movement of plate 78 brings cam 188 into engagement with micro-switch 186 to open the same, this shutting down the hydrant 10 until it is again set into operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

Having described the invention what is claimed as new is as follows:

1. A hydrant for a subterranean irrigation system comprising a surface water outlet provided with a manual valve that has a valve operator, a hydrant casing including branches and a water inlet opening into said casing, said branches radiating outwardly from said inlet, means detachably connecting said inlet of said casing to the water outlet by attachment with said valve operator which extends through said inlet and casing, said branches adapted to service borders adjacent to the hydrant, a plurality of valves in said casing, and means for sequentially opening and closing said plurality of valves in said casing to supply water through said branches to successive borders.

2. A hydrant for a subterranean irrigation system comprising a surface water outlet provided with a manual valve that has a valve operator, a hydrant casing including branches and a water inlet opening into said casing, said branches radiating outwardly from said inlet, means detachably connecting said inlet of said casing to the water outlet by attachment with said valve operator which extends through said inlet and casing, said branches adapted to service borders adjacent to the hydrant, a plurality of valves in the casing, each valve operatively connected to a separate branch to control flow therethrough, valve actuating means for sequentially opening and closing said valves in said casing to supply water through said branches to successive borders, and means operatively connected with said valve actuating means for controlling said valve actuating means in response to the water level in the borders.

3. A portable and automatic hydrant for a subterranean irrigation system comprising a surface water outlet provided with a manual valve that has a valve operator, a hydrant casing including branches and a water inlet opening into said casing, means detachably connecting said casing to the water outlet by attachment with said valve operator, said branches adapted to service borders adjacent to the hydrant, a valve operatively connected to each branch in the casing, means for sequentially opening and closing said valves in said casing to supply water to successive borders, means operatively connected with the valve opening and closing means for controlling said valve actuating means in response to the water level in the borders, said controlling means including a float operated switch in each border, means for providing an electrical signal in response to the actuation of one of said float operated switches to initiate the cycle of operation of another hydrant.

4. The hydrant of claim 3, wherein there is a switch that is operated in response to the completion of a cycle of operation of said hydrant, and means associated with the last mentioned switch for terminating said cycle.

5. In an irrigation system which has a water outlet, a hydrant comprising a hydrant body that includes branches, a valve operatively connected to each branch within the body, said valves having valve stems, a rotary plate provided with a cam, mechanical means on said cam and operatively connected with each valve stem for opening and closing said valves in response to rotation of said plate, an electric motor, means drivingly connecting said electric motor with said rotary plate to actuate said rotary plate, means including an electrical circuit for automatically energizing said motor to open and close successive valves of said branches, a switch actuated by the opening motion of each valve and in circuit with said motor to open the motor circuit when the valve is in the open position, means including additional switches sensitive to water level adjacent to the hydrant for by-passing the valve operated switch and again energizing the motor through said circuit so that the valve operatively connected to another branch is actuated.

6. In an irrigation system which has a water outlet, a hydrant comprising a hydrant body that includes branches, a valve operatively connected to each branch within the body, said valves having valve stems, a rotary plate provided with a cam, mechanical means on said cam and operatively connected with each valve stem for opening and closing said valves in response to rotation of said plate, an electric motor, means drivingly connecting said electric motor with said rotary plate to actuate said rotary plate, means including an electrical circuit for automatically energizing said motor to open and close successive valves of said casing branches, a switch actuated by the opening motion of each valve and in circuit with said motor to open the motor circuit when the valve is in the open position, means including additional switches sensitive to water level adjacent to the hydrant for by-passing the valve operated switch and again energizing the motor through said circuit so that the valve operatively connected to another branch is actuated from the closed to the open position at which the valve operated switch associated therewith is opened by opening the motor circuit again and enabling water flow through its branch.

7. The hydrant of claim 6 wherein there is a water level sensitive switch operatively connected with each valve, and one of said water level sensitive switches having a circuit connector with which there is a wire operatively connected in order to provide an electrical signal for a next adjacent hydrant.

References Cited in the file of this patent
UNITED STATES PATENTS

| | | |
|---|---|---|
| 754,953 | Williams et al. | Mar. 15, 1904 |
| 972,384 | Kellar | Oct. 11, 1910 |
| 1,550,196 | Behringer | Aug. 18, 1925 |
| 1,842,382 | Arey | Jan. 26, 1932 |
| 2,081,510 | Smart | May 25, 1937 |
| 2,188,243 | Johnson | Jan. 23, 1940 |
| 2,642,076 | Tigert | June 16, 1953 |